United States Patent [19]
Johnson

[11] Patent Number: 5,452,446
[45] Date of Patent: Sep. 19, 1995

[54] METHOD AND APPARATUS FOR MANAGING DYNAMIC VEHICLE DATA RECORDING DATA BY CURRENT TIME MINUS LATENCY

[75] Inventor: Steven F. Johnson, Kalamazoo, Mich.

[73] Assignee: SPX Corporation, Muskegon, Mich.

[21] Appl. No.: 975,424

[22] Filed: Nov. 12, 1992

[51] Int. Cl.⁶ ............................................. G06F 17/40
[52] U.S. Cl. ........................ 395/600; 364/424.04; 364/424.03; 364/DIG. 1
[58] Field of Search ................ 395/600, 575; 364/424.04, 481, 424.03; 371/15.1; 360/5

[56] References Cited

U.S. PATENT DOCUMENTS

| | | | |
|---|---|---|---|
| 3,681,748 | 8/1972 | Diltz | 340/15.5 |
| 4,206,509 | 6/1980 | Ruehle | 367/42 |
| 4,258,421 | 3/1981 | Juhasz et al. | 364/424.04 |
| 4,409,670 | 10/1983 | Herndon et al. | 364/424.04 |
| 4,545,029 | 10/1985 | Collier | 395/550 |
| 4,646,241 | 2/1987 | Ratchford et al. | 364/424.04 |
| 4,755,951 | 7/1988 | Hollister | 364/487 |
| 4,777,618 | 10/1988 | Nakano et al. | 364/900 |
| 4,908,825 | 3/1990 | Vea | 370/110.3 |
| 4,939,652 | 7/1990 | Steiner | 364/424.03 |
| 5,067,130 | 11/1991 | Jackson | 371/22.1 |
| 5,081,592 | 1/1992 | Jenq | 364/487 |
| 5,126,940 | 6/1992 | Haubner | 364/424.1 |
| 5,191,326 | 3/1993 | Montgomery | 340/855.5 |
| 5,253,224 | 10/1993 | Van Doesburg | 368/10 |

Primary Examiner—Thomas G. Black
Assistant Examiner—Larry J. Ellcessor
Attorney, Agent, or Firm—Clifford Kraft

[57] ABSTRACT

A method and system relating to management of dynamic vehicle data from data sources that produce data entries that have both type and latency and are possibly periodic. Data sources produce data entries that are entered into a fixed interval data storage structure that has positions related to times. Data entries are entered into the storage structure at a position represented by the position of the current time minus the known latency of the data source. The position in the structure representing the current time is updated at predetermined times so that the structure represents a historical record in real time. Data clients receive notification of availability of data and request retrievals from the fixed interval storage structure of either current or historical data entries. When a current entry of a given data type is requested, the system returns the most recent data of that type stored. When historical data is requested, the system returns the first data entry of that type before the position in the structure to that representing the historical time requested. Fixed times can be marked in the structure by clients, and data can be retrieved relative to these marked locations. Data sources receive notification of the need to acquire new measurements or terminate acquisition of measurements as requested by data clients.

14 Claims, 5 Drawing Sheets

METHOD AND APPARATUS FOR MANAGING DYNAMIC VEHICLE DATA RECORDING DATA BY CURRENT TIME MINUS LATENCY

BACKGROUND

1. Field of the Invention

This invention relates generally to the field of vehicle diagnostics and more particularly to the problem of time correlation and management of a plurality of sources of sampled vehicle data, each with different data type, period and latency.

2. Description of the Related Art

Diagnostic systems and vehicle analyzers take real time data from numerous data points. Each of these data sources produces data of a certain format and at certain times. Some data sources produce data periodically (at predetermined times), while some only produce data randomly (at non-fixed times). Some data sources supply data at high rates such a probe that samples engine RPM, while others only supply data infrequently. Data entries from each data source have the property of latency associated with that particular source. Latency refers to the time interval between when the data is valid and when the source reports it. Latency is primarily caused by the length of time it takes a source to acquire and communicate data. Thus, a data management system is faced with one or more incoming data streams of different rates, formats, lengths, latencies and periods. It is a great problem to sort, store, and correlate these data so that they can be used or analyzed.

A diagnostic system or vehicle analyzer also contains one or more clients for the various data streams. Each client is interested in data from one, several, or possibly many of the data sources. Clients can consist of processing routines, displays, communication channels, and other output devices as well as any use for the data from one or more data sources. A single client may need data from several sources, each of which supplys the data at a different rate and in a different format. Some clients need some of the data from past times that represent historical events that need to be analyzed. Other clients may need data from a specific source whenever it is available. Some clients may need to be informed when expected data from a given periodic source did not arrive within its period. Also, different data clients may need different collections of data at different times from different sources. Therefore, it is important to be able to dynamically change and manage the logical relationships between data clients and data sources including allocation and deallocation of various data sources.

It is evident that the diverse modes, rates, formats and latency of data arriving from sources coupled with the various demands of data clients presents a very difficult problem in data management and time correlation. A time data management system must somehow store and retrieve all data entries with respect to historical time. It must take into account the periodicity and latency of each data source, and it must accommodate the demands of each data client. It must be able to find various historical data entries on demand, and it must be able to mark its historical data list so that events of importance can be referenced.

For the foregoing reasons, there is a need for a method and system and/or apparatus for data management in the field of vehicle diagnosis and analysis that can store, correlate, and mark various historical data entries according to periodicity and latency as well as retrieve both current and historical data for data clients on demand. Such a system must be able to provide the most recent data from sources to clients and provide information when a data entry has not arrived on schedule from a data source.

SUMMARY OF THE INVENTION

The present invention comprises an apparatus, method, or computer software system for managing dynamic vehicle data from one or more data sources where such data has period and latency. The invention comprises a fixed interval data storage structure that may be constructed from a logical drum type storage structure in the memory of a digital computer or a on disk storage device associated with a digital computer. This fixed interval storage structure logically resembles a map or matrix with columns representing fixed instants in time and rows representing data types. Each column represents a time position. One column represents the current time. The location of this column is updated at predetermined times so that the structure represents a scrolling historical record. The abstract fixed interval data structure extends indefinitely into the past and future. Real storage methods used to construct the fixed interval data structure are necessarily limited in temporal extent. The fixed interval data structure can be constructed entirely within the storage of a digital computer, or it can be an apparatus made from first-in first-out (FIFO) integrated circuits well known in the art.

A plurality of dynamic vehicle data sources, each of which can supply data entries, interrupt the process at either periodic or non-uniform times to enter data into the system. Each data entry from a data source has the property of type. Type usually refers to which source the data entry came from. A data entry from any given data source is preprocessed in a certain manner dependent upon the nature of the data supplied from that particular source so that a final data entry is produced suitable for storage in the fixed time interval storage structure. Some data sources produce large quantities of data so that a pointer to the data, rather than the actual data itself, is stored in the fixed interval data structure. An incoming data entry is entered in the column of the structure corresponding to the current time minus the known data latency of that particular data source. It is entered in the row corresponding to the that source or the type of data generated by that source.

The data management system services one or more data clients that can request data of a given type at any time. Data clients can request either current data entries or historical data entries. If a client requests a current data entry of a given type, the system returns the most recent data entry of that type. If a client requests a historical data entry, the system returns the data entry of that type nearest to the historical time requested or the data first entry before the historical time requested. The system can be constrained to return a data entry that is only older than a historical time, younger than a historical time or simply nearest to the specified historical time.

Clients can request marks or markers be logically placed in the fixed interval data structure at certain historic times. Then requests can be made for data entries of a certain type from some historic time relative to a certain marker. This allows significant or special historical times to be marked.

A client can also request that whenever a data entry arrives from a given source, that client is notified of its arrival so that it can request retrieval. A client can also request to be notified when data from a source of known periodicity fails to arrive within the time of its period.

The fixed interval storage means may be constructed in the form of a logical drum data structure. In this type of structure, the data is stored in successive locations on disk or in computer memory until a maximum address is reached. The next data entry is made at the lowest address in the structure destroying the entry that had occupied that address. The process continues until the highest address is again reached, and again the next data entry is entered at the beginning. This is a circular list or circular array that resembles a mechanical rotating data drum or recording mechanism. The size of the list (or effective circumference of the drum) is made large enough to handle the oldest historical data entry of interest.

The invention provides a means of managing and time correlating data in various formats that arrives randomly or periodically from a plurality of data sources, each of which may have latency. The invention can retrieve current data or historical data from any fixed or relative past time.

BRIEF DESCRIPTION OF THE DRAWINGS

For a more complete understanding of this invention, reference should now be made to the embodiments illustrated in greater detail in the accompanying drawings and described below by way of examples of the invention.

It should be understood, of course, that the invention is not necessarily limited to the particular embodiments illustrated herein.

DESCRIPTION OF PREFERRED EMBODIMENT

Figure 1:
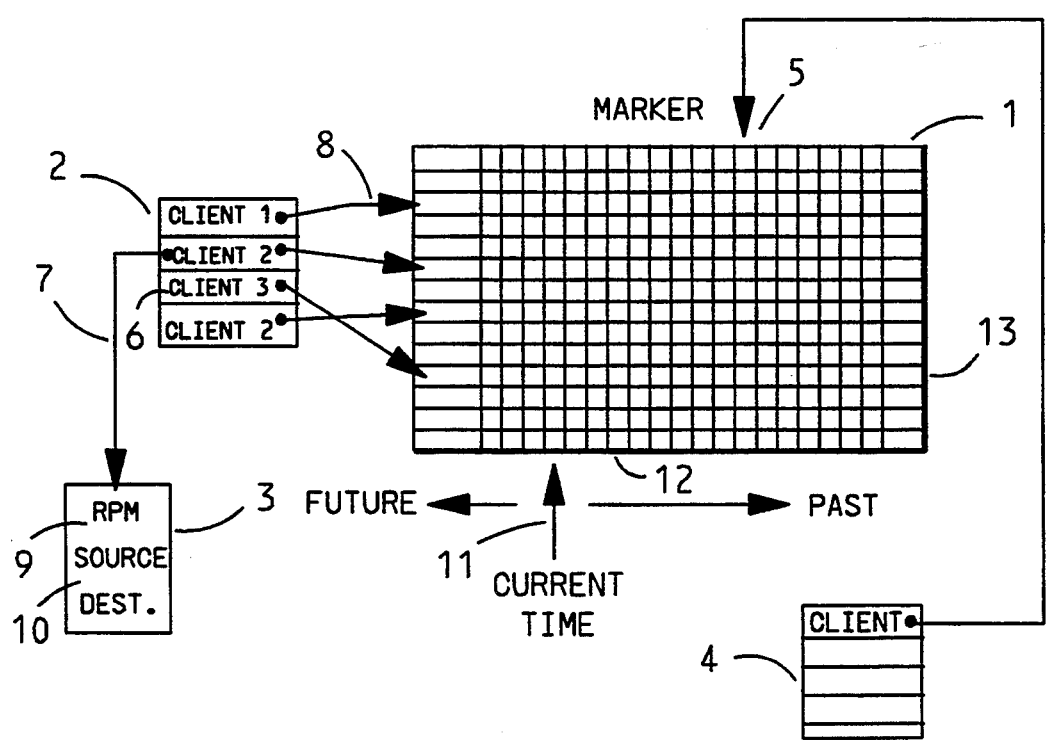
FIG. 1 is a schematic diagram of the fixed interval data structure showing pointer connections to ancillary lists.

Referring now to FIG. 1, the basic data structures of the invention are shown. The fixed interval data structure 1 logically resembles a two dimensional array. However, conceptually it extends into the infinite past and into the infinite future. Time is along the horizontal axis with past or historical time toward the right in FIG. 1. Each column in the structure 1 represents a fixed time interval with the current time marked by a pointer 11. Thus, a column to the right of the current time pointer such as 12 represents a time interval that occurred before the current time.

Each row in the fixed interval data structure represents a different data type. A typical row such as 13 would thus represent some type of data coming from a unique data source. Data sources can supply data concerning engine RPM, temperature, oil pressure, air flow rate, and any other possible vehicle parameter. Thus, the data entered in a row 13 might for example represent RPM. Each client may need data from one or a plurality of data sources. Thus the clients needs may be organized into a measurement table 2 that specifies which data a given client needs. Such a table 2 would allow a given client to reference as many positions as different sources it needed data from. Each row of table 2 thus represents one data need for the recorded client 6. Each row can contain a pointer 8 to a row in the fixed interval list, and another pointer 7 to a measurement description table 3. Entries in the measurement description table can represent the data type 9 or other pertinent information 10. A given data client may need data from more than one source. Therefore, an entry for a certain client may appear more than once in the table. The table 2 can be reorganized dynamically as data needs for a given client change.

The measurement table 2 can be organized with pointers as shown in FIG. 1, or it can be organized as a bit map. Each position in the bitmap can be in the same relative position as entries in a client list table (not shown) and can contain a true or false value to indicate the client's need for data of a certain type.

Any client can also create time markers 5 in the fixed interval data structure 1. Markers are managed by keeping them in a marker list 4 by the client that owns them with a pointer to the actual time location of the marker 5.

It should be understood that the data structures and lists shown in FIG. 1 represent only one manner of practicing the invention. Many other types of data structures and lists could be used to accomplish the goals of the invention. Numerous modifications to the data structures of FIG. 1 are thus possible that remain within the scope of the invention.

Figure 2:
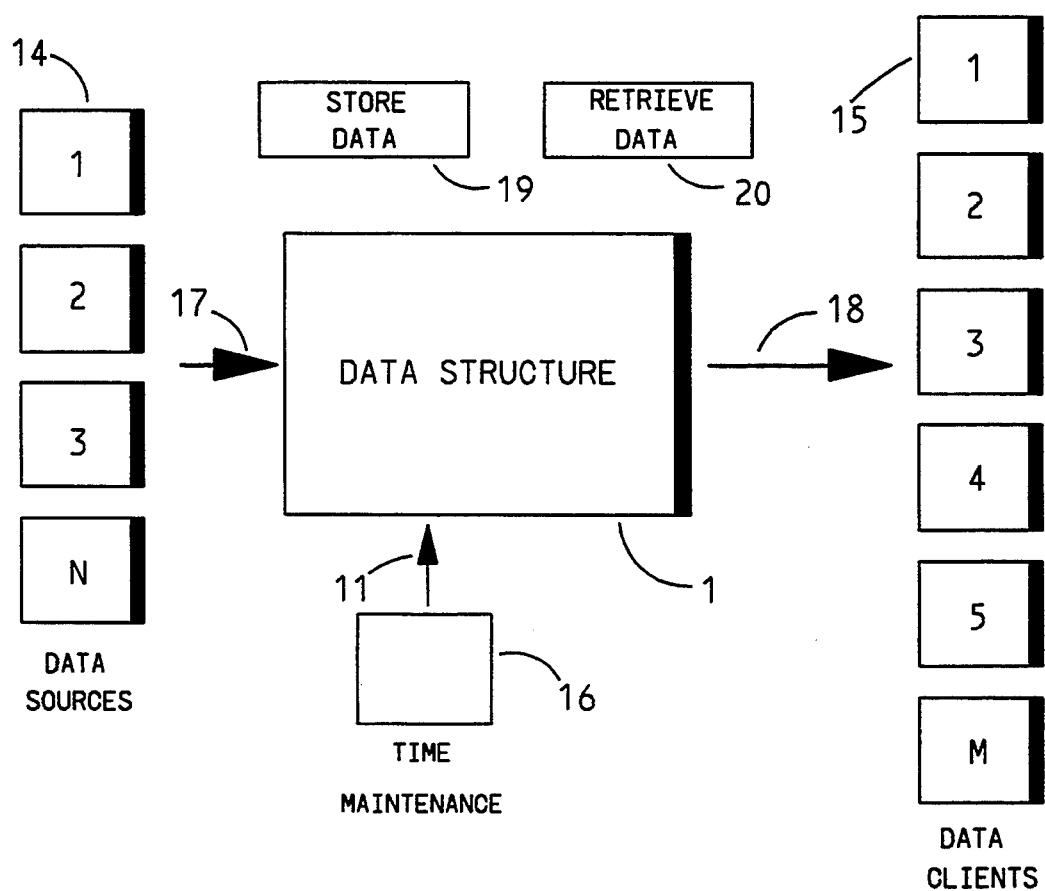
FIG. 2 is a conceptual diagram of the overall operation of the invention.

Referring now to FIG. 2, the operation of the invention is depicted. One, or a plurality of data sources 14 create data at various times, rates, and latencies. These sources supply dynamic vehicle data for analysis and use by data clients. The store data manager 19 causes each data entry to be entered into the fixed interval data structure 1 at a time position at the current time minus the latency of the data source. Thus data flows 17 from the data sources into the fixed interval data structure with data entries occurring at random times. Data entries are usually driven by processor interrupts. Each data entry may have to be adjusted and formatted so that all data entries in the fixed interval data structure 1 are similar. For sources that produce large quantities of data, the actual data is stored in auxiliary buffers (not shown in FIG. 2), and the data entry stored in the fixed interval data structure 1 (FIG. 1) is a pointer to the actual data. It is well known in the art that pointers to actual data can be stored and moved in place of the data itself.

The current time position 11 of the fixed interval data structure 1 is controled by the time maintenance manager 16. This manager's task is to maintain a real time clock that is normally updated by external timer interrupt. When the basic time interval represented by each column in the fixed interval data structure 1 has passed, the time maintenance manager 16 updates the pointer to the current time location 11.

Data retrieval is driven by requests from one or a plurality of data clients 15. Each client may need data from several data sources. If a client requests current or historical data, the data retrieval manager 20 searches for a data entry of the requested type in the fixed interval data structure 1. If current data is requested, the most recent data of the given type is returned to the requesting client. If historical data is requested, the data entry of the requested type nearest to the requested historical time point is returned, or the first data entry before the requested historical time point is returned.

Some clients may need data from a data source whenever it occurs. It is the job of store data manager 19 to supply this data or set a flag or semaphore to notify the data retrieval manager 20 that the data is available. This communication process is not shown in FIG. 2.

Some data clients may need to know when data from a periodic data source has not arrived within the source data period. It is the job of the time maintenance manager 16 to supply this information or set a flag or semaphore to notify the data retrieval manager 20 to supply this notification. This communication process is not shown in FIG. 2.

Figure 3:
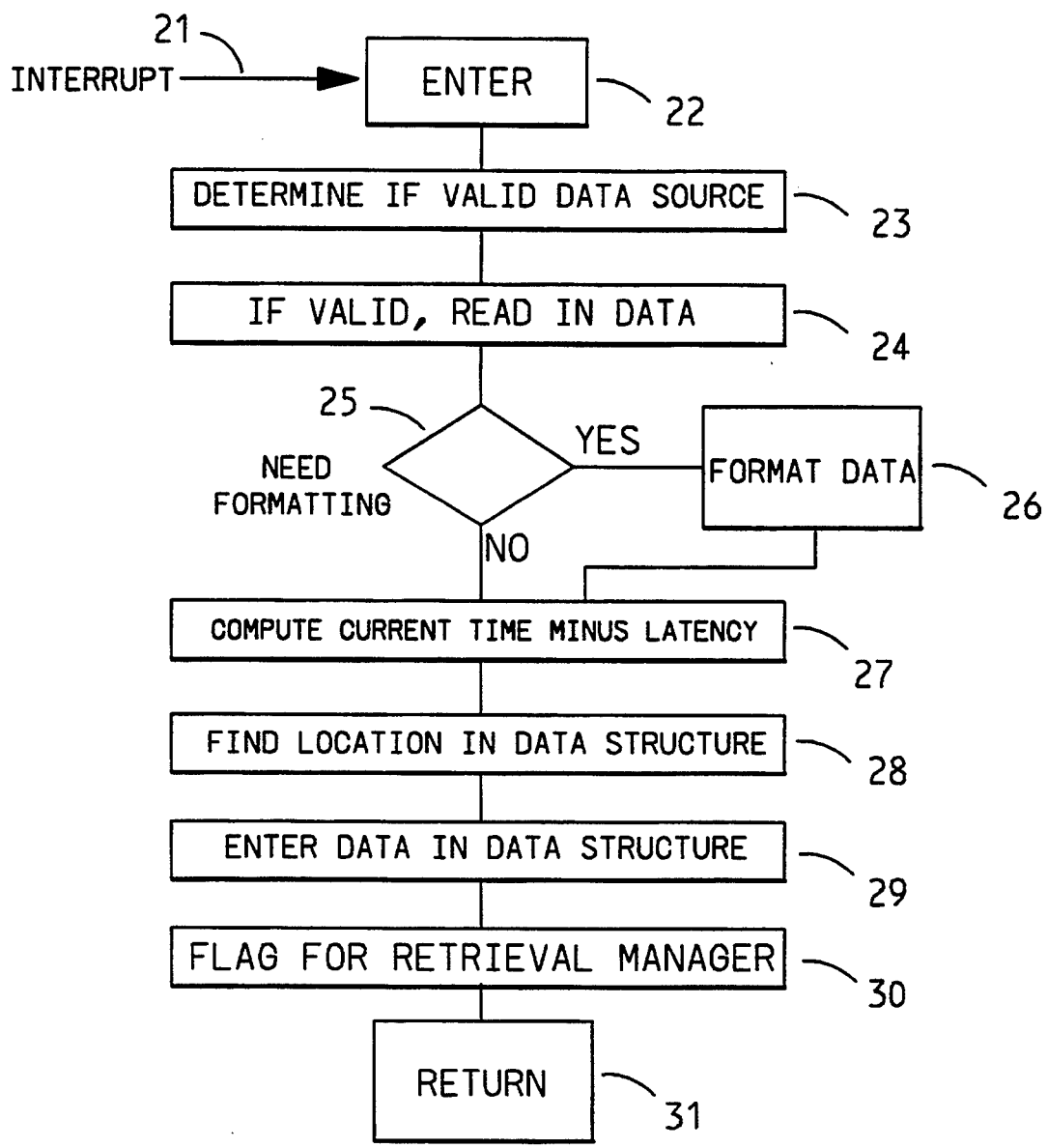
FIG. 3 is a flow chart of the data entry operation.

Referring now to FIG. 3, the operation of the store data manager 19 (in FIG. 2) is shown. This store process is entered 22 upon an interrupt 21 when any data source has a data entry to transfer. First 23, the process must determine if the interrupt is from a valid data source and which source that is. If the interrupt is from a valid source, the raw data from the source must be read 24 into a buffer storage area. Next, the process must determine 25 if data from that particular source needs to be formatted. This is done by referring to a table that describes the characteristics of each source (not shown). If the source data needs to be formatted, that is done 26. If not, control simply passes to the next step. Data can also be validated at this point, and data entries can be flagged or ignored when data is not valid. In the next step 27, the current time needs to be computed, and the data latency associated with the source needs to be looked up from a table (not shown). Then the latency is subtracted from the current time 27. The correct location for that new time is then located 29 in the fixed interval data structure 1 (FIGS. 1 and 2). This is usually accomplished with a pointer that is maintained by the time maintenance manager 16 (FIG. 2). The formatted data is then entered 29 into the fixed interval data structure. Finally, a flag or semaphore may be set to notify the data retrieval manager that current data has arrived from the source 30. The process then returns 31.

Figure 4:
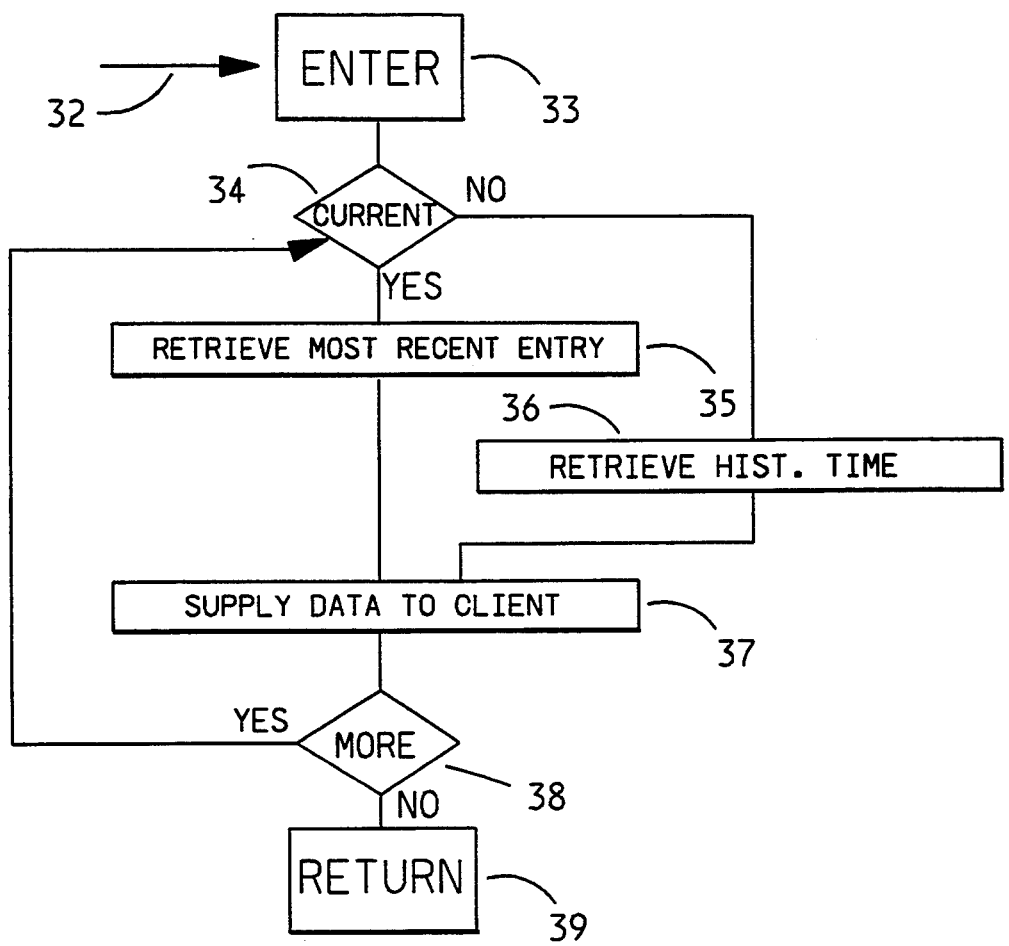
FIG. 4 is a flow chart of the data retrieval operation.

Referring now to FIG. 4, the operation of the retrieval data manager is shown. The process is entered 33 by a request from a client for data 32. The process determines 34 if the request is for current data or for historical data. If the request is for current data, the most recent data entry of the requested type is retrieved 35. If the request is for historical data, the data entry nearest to or before the historical time point indicated is retrieved 36. After the data entry is retrieved from the fixed interval data structure 1 (FIGS. 1 and 2), the data is possibly re-formatted for the client (not shown) and then supplied or queued for transmission to the requesting client 37. The process next reexamines the request to determine if more data entries were requested 38. It is possible in one request to request multiple data entries. If no more data was requested, or the list of data requests from that client is exhausted, the process returns 39. If more data is requested, the process branches to the point where it asks the nature of the time of the data requested (current or historical) 34.

The data retrieval manager can also retrieve data at or near a marker point set into the fixed interval data structure if requested. In this case it simply looks up the location of the marker and retrieves the data entry of the requested type nearest the marker.

Figure 5:
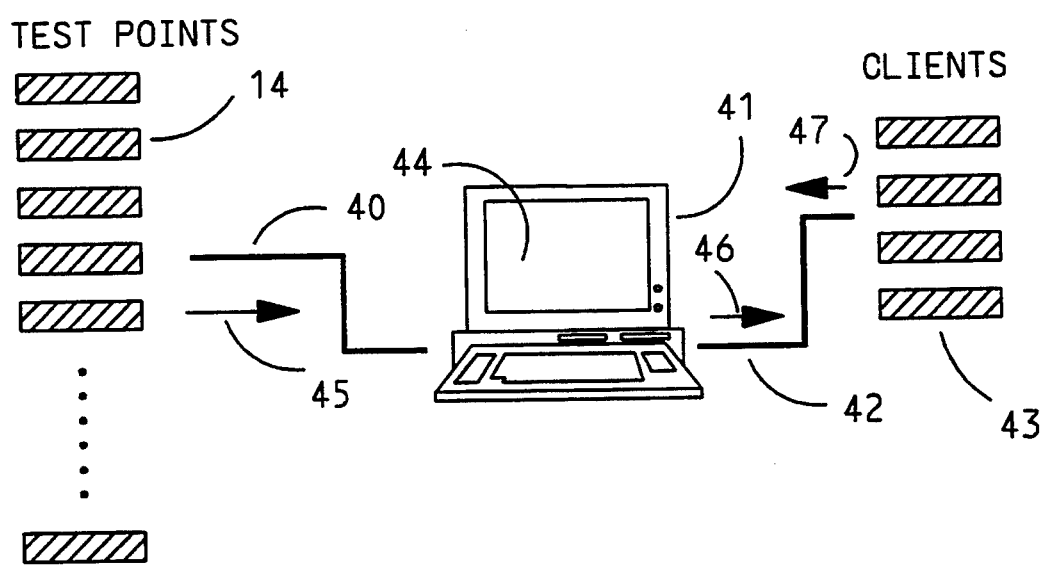
FIG. 5 is a schematic diagram of the apparatus of the invention including data sources, data clients, processor, and communication paths.

Referring now to FIG. 5 the overall apparatus of one embodiment of the invention is shown. The data sources are probes and test points 14 attached to a vehicle (not shown). Each data source supplies data entries 45 with latency at varying rates and periods. Data is communicated from the data sources via an input data communication path 40 to a processing means 41 that can be a personal computer. Many data clients reside in the memory of the processing means 41 as subroutines or sub-tasks that require data from data sources. Some data clients 43 are external to the processing means. For these data clients, data entries 46 are communicated over an output data communications path 42 upon the receipt of requests for data 47. The screen or display 44 of the processing means, if there is one, can also be a data client. In addition to raw data entries directly from the fixed interval data structure, processed or refined data may be communicated over the output communications data path 42 to external clients 43.

The input data communications path 40 and the output data communications path 42 can be RS-232, well known in the computer art, high speed parallel bus such as a printer bus, specialized bus such as Future Bus, ISA bus or other bus, IEEE 488, light fiber, or any other means for communicating data.

The processing means can be a personal computer such as any variation on the IBM Personal Computer system, the IBM AT, XT, or PS series or clone, or it can be a minicomputer, or any commercially available processing system. It can also be constructed from a conventional microprocessor chip with memory such as the Intel 8086-80486 series or the Motorola 68000-60040 series or any other microprocessor. It could also be constructed from a digital signal processor chip such as the Motorola DSP-56000 series. The best mode of practicing the invention is to use standard or specialized data acquisition boards in conjunction with a personal computer or equivalent clone. The communications channels are the computer's standard ISA bus, well known in the art.

It is to be understood that the above-described arrangements are merely illustrative of the application of the principles of the invention, and that other arrangements may be devised by those skilled in the art without departing from the spirit and scope of the invention.

I claim:

1. A method for management of dynamic data comprising:

receiving data entries with data type and latency from data sources;

storing said data entries in a data storage structure having data types, current time, and time positions, each data entry being stored by type at a time position corresponding to current time minus latency;

retrieving data entries from the data storage structure based upon requests from data clients, said requests specifying data type and historical time, each request causing retrieval of a data entry from a time position corresponding to the historical time requested if that time position contains a data entry of the type requested.

2. A method for management of dynamic vehicle data comprising:

receiving data entries with data type and latency from data sources at non-fixed and predetermined times;

storing said data entries in a data storage structure having data types, current time, and time positions, each data entry being stored by type at a time position corresponding to current time minus latency;
updating said current time at predetermined intervals;
receiving requests from data clients for data retrieval, said requests specifying data type and historical time;
retrieving data entries from the data storage structure based upon said requests by returning a data entry from a time position corresponding to the historical time requested if that time position contains a data entry of the type requested, otherwise returning a data entry of the type requested from a time position containing a data entry of the type requested whose corresponding time is nearest in time to the historical time requested.

3. The method of claim 2 wherein the data storage structure is a logical drum storage structure.

4. The method of claim 2 wherein some data entries are pointers to data blocks.

5. The method of claim 2 further comprising:
marking particular time positions in said data storage structure;
receiving requests for data retrieval from data clients specifying data type, and requesting data entries of a fixed time relative to the time corresponding to a particular marked time position;
determining a specific time by adding said fixed time to the time corresponding to said particular marked time position;
retrieving data entries from the data storage structure based upon said requests by returning a data entry from said specific time position if said specific time position contains a data entry of the type requested, otherwise returning a data entry from a time position containing a data entry of the type requested whose corresponding time is nearest in time to said specific time.

6. The method of claim 2 further comprising notifying predetermined data clients when a data entry from a particular data source arrives.

7. The method of claim 2 further comprising notifying predetermined data clients when an expected data entry from a particular periodic data source has failed to arrive.

8. Apparatus for management of dynamic vehicle data with different periods and latencies comprising, in combination:
one or more data sources supplying incoming data entries with data type and latency;
one or more data clients with data requests specifying data type and historical time;
a processor, said processor:
storing said incoming data entries in a data storage structure having data types, current time, and time positions, each data entry being stored by type at a time position corresponding to current time minus latency;
updating said current time at predetermined intervals;
retrieving data entries from the data storage structure based upon said requests by returning a retrieved data entry from a time position corresponding to the historical time requested if that time position contains a data entry of the type requested, otherwise returning a retrieved data entry from a time position containing a data entry of the type requested whose corresponding time is nearest in time to the historical time requested;
means for transmitting incoming data entries from said data sources to the processor;
means for transmitting data requests from said data clients to the processor;
means for transmitting retrieved data entries from the processor to said data clients.

9. The apparatus of claim 8 wherein the processor is a personal computer.

10. The apparatus of claim 8 wherein some data entries are pointers to data blocks.

11. Apparatus for data management of dynamic vehicle data with different periods and latencies comprising, in combination:
one or more data sources supplying incoming data entries each with type and latency;
data storage means for storing said incoming data entries in a data storage structure having data types, current time, and time positions, each data entry being stored by type at a time position corresponding to current time minus latency;
means for communicating incoming data entries from the data sources to said data storage means;
means for updating said current time at predetermined times;
one or more data clients with data requests specifying data type and historical time;
data retrieval means for retrieving data entries from the data storage structure based upon said requests by returning a retrieved data entry from a time position corresponding to the historical time requested if that time position contains a data entry of the type requested, otherwise returning a retrieved data entry from a time position containing a data entry of the type requested whose corresponding time is nearest in time to the historical time requested;
means for communicating retrieved data entries from said data retrieval means to said data clients.

12. The apparatus of claim 11 wherein the data storage structure is a logical drum data structure.

13. The apparatus of claim 11 further comprising:
marking means for marking particular time positions in said data storage structure;
one or more data clients specifying data type and requesting data entries of a fixed time relative to the time corresponding to a particular marked time position;
means for determining a specific time by adding said fixed time to the time corresponding to said particular marked time position;
data retrieval means for retrieving data entries from the data storage structure based upon said requests by returning a data entry from said specific time position if said specific time position contains a data entry of the type requested, otherwise returning a data entry from a time position containing a data entry of the type requested whose corresponding time is nearest in time to said specific time.

14. The apparatus of claim 11 wherein data some entries are pointers to data blocks.

* * * * *